United States Patent [19]
Asami et al.

[11] Patent Number: 5,489,492
[45] Date of Patent: Feb. 6, 1996

[54] COMPOSITE SHEET ELECTRODE

[75] Inventors: Keiichi Asami; Hideki Takahashi; Katsuo Inoue; Yoshiaki Echigo, all of Uji; Toshiyuki Ohsawa, Tokyo; Toshiyuki Kabata, Tokyo; Okitoshi Kimura, Tokyo, all of Japan

[73] Assignees: Unitika Ltd., Hyogo; Ricoh Company, Ltd., Tokyo, Japan

[21] Appl. No.: 285,121

[22] Filed: Aug. 1, 1994

Related U.S. Application Data

[63] Continuation of Ser. No. 879,172, May 6, 1992, abandoned.

[30] Foreign Application Priority Data

| May 8, 1991 | [JP] | Japan | 3-102844 |
| Aug. 26, 1991 | [JP] | Japan | 3-213525 |
| Jan. 23, 1992 | [JP] | Japan | 4-010147 |

[51] Int. Cl.$^6$ ............................................ H01M 4/02
[52] U.S. Cl. .................. 429/212; 429/213; 429/215; 429/218; 429/232; 429/233; 429/235; 429/241; 429/245
[58] Field of Search ................................ 429/212, 213, 429/215, 218, 232, 233, 235, 241, 245

[56] References Cited

U.S. PATENT DOCUMENTS

| 4,161,569 | 7/1979 | Faker | 429/234 |
| 4,223,081 | 9/1980 | Faber | 429/234 |
| 4,560,632 | 12/1985 | Alberto | 429/196 |
| 4,731,310 | 3/1988 | Anderman et al. | 429/194 |
| 4,735,875 | 4/1988 | Anderman et al. | 429/194 |
| 4,925,752 | 5/1990 | Fauteux et al. | 429/191 |
| 5,080,963 | 1/1992 | Tatarchuk et al. | 428/225 |

FOREIGN PATENT DOCUMENTS

| 0070347 | 6/1978 | Japan | 429/232 |
| 0018368 | 2/1981 | Japan | 429/232 |

*Primary Examiner*—Prince Willis, Jr.
*Assistant Examiner*—M. Nuzzolillo
*Attorney, Agent, or Firm*—Wenderoth, Lind & Ponack

[57] ABSTRACT

The present invention provides a composite sheet electrode which has high strength, excellent current collecting properties and which is used efficiently as an active material for an electrode. The electrode has excellent discharge capacities and can be easily formed into an electrode terminal. A cell employing this electrode is also disclosed. The invention also provides a composite sheet electrode having a porosity of 20 to 80% containing 5 to 95% by weight of an active material of an electrode, 1 to 50% by weight of a current collecting material and heat fusible short fibers. The present invention also provides a composite sheet electrode having a porosity of 20 to 80%, which is made up of a composite sheet containing 5 to 95% by weight of an active material as an electrode and 5 to 95% by weight of heat fusible short fibers, as well as a current collecting material layer formed on said composite sheet. The present invention further provides a cell employing the latter-mentioned composite sheet electrode.

8 Claims, 1 Drawing Sheet

COMPOSITE SHEET ELECTRODE

This application is a continuation of now abandoned application, Ser. No. 07/879,172, filed May 6, 1992.

FIELD OF THE INVENTION

The present invention relates to a composite sheet electrode and a cell employing the same.

BACKGROUND OF THE INVENTION

An electrode for a new type of secondary cell (or battery) has been intensely studied in order to enhance the energy density and out-put of the cell. For example, it has been proposed to employ, as the active material for the positive electrode, a transition metal oxide or a chalcogenide compound (such as $TiS_2$, $MoS_2$, $CoO_2$, $V_2O_5$, $FeS_2$, $NbS_2$, $ZrS_2$, $NiPS_3$, $VSe_2$, $MnO_2$ and the like), a graphite compound prepared by heat-polymerizing organic materials, carbon fluoride, graphite, or an electroconductive polymer material (such as polyacetylene, polypyrrole, polyaniline, polyazulene and the like). As the active material for the negative electrode, a composite electrode using lithium, lithium alloy and graphite has also been proposed. The proposed electrode active materials are capable of lightening the weight and enhancing the energy density of the cell in comparison with conventional materials.

However, the proposed electrode materials have some problems to be solved in order to be actually mounted in such cells. Especially, one important problem resides in the current collective ability of the cell and in the formation of an electrode from the active material and therefore it is desired to develop a composite sheet electrode which is capable of fully collecting the electric current from the electrode materials.

Conventional pellets for coin type cells, for example, are prepared by mixing carbon powder, an electrode active material and optionally a bonding material (such as Teflon® powder) and then pressure-molding. The carbon powder in these pellets acts as a current collecting material, but if the amount of carbon powder is increased in order to enhance the current collecting ability, the other properties of the cell such as energy density and mechanical strength are deteriorated. Thus, the amount of carbon powder is limited to a certain degree and its discharge capacity is also limited. Also, it is difficult to form sheet electrodes from the conventional pellets.

In order to resolve the above problems, British Patent Specification 1,216,549 proposes the electroconductive polymer material listed above, which can be formed into a sheet which has good current collecting ability. The patent states that the proposed polymer material enhances the energy density of a polymer secondary cell. The electrode employing the proposed polymer material, however, still has poor current collecting ability in positive electrodes and the performance of the electroconductive polymer material is poor.

In order to resolve the above problems, Japanese Kokai Publication 58-206066 proposes an electrode which comprises a gelled material of polyacetylene containing toluene, a porous metal material and a carbon fiber. Japanese Kokai Publication 61-206066 also proposes an electrode which comprises a film of fibrous polyaniline obtained by an electropolymerization process in which carbon particles are dispersed. These electrodes, however, have a poor current collecting ability and poor strength.

Japanese Kokai Publications 62-176046 and 63-259965 disclose pellets which are prepared by filling the electroconductive polymer material in the pores of a porous substrate. However, since the pores are not completely continuous, it is difficult to fully fill the polymer material in them. Even if the pores are fully filled, the electrode reaction does not smoothly progress because of some incontinuous pores.

Japanese Kokai Publication 1-300814 further proposes a composite electrode which is prepared by filling the active material as an electrode in the pores of a continuous porous sheet of carbon which has good current collecting ability. However, in order to fill the electrode-active material, the porosity of the porous sheet must be increased, and the higher the porosity, the lower the strength.

SUMMARY OF THE INVENTION

The present invention provides a composite sheet electrode which has high strength, excellent current collecting ability and the efficiency of the active material as the electrode, smoother current flowability, easy selection of discharge capacity and preparation into an electrode terminal, and a cell employing the same. The present invention accordingly provides a composite sheet electrode having a porosity of 20 to 80%, which comprises 5 to 95% by weight of an active material as an electrode, 1 to 50% by weight of a current collecting material and heat fusable short fibers.

The present invention also provides a composite sheet electrode having a porosity of 20 to 80%, which comprises:
 a composite sheet comprising 5 to 95% by weight of an active material as an electrode and 5 to 95% by weight of heat fusable short fibers, and
 a current collecting material layer formed on said composite sheet.

The present invention further provides a cell employing the above mentioned composite sheet electrode.

DETAILED DESCRIPTION OF THE INVENTION

Figure 1:
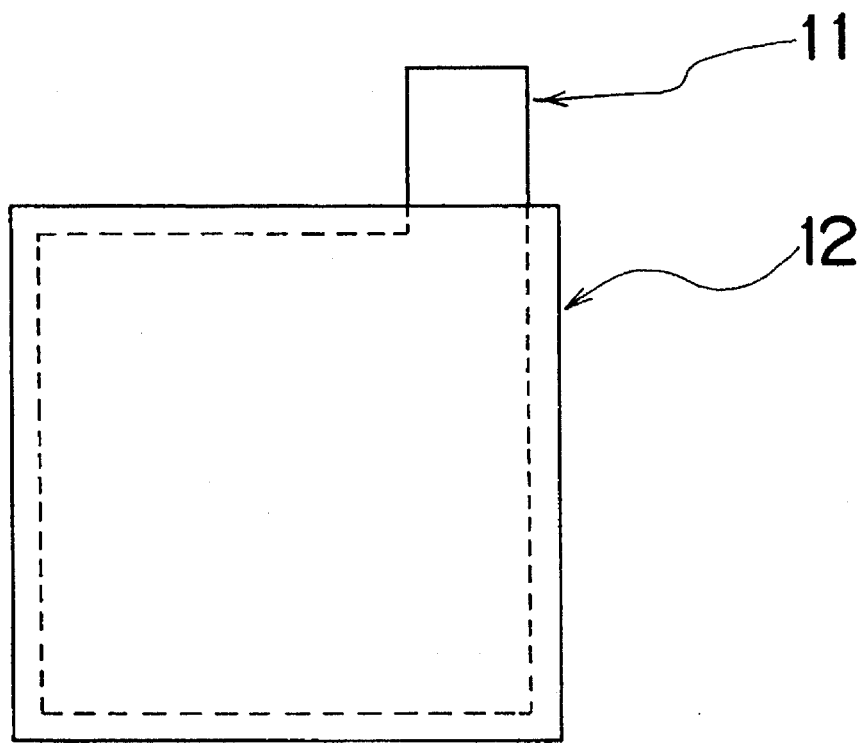
FIG. 1 is a composite sheet electrode

The active electrode material employed in the present invention as a positive electrode includes a transition metal oxide or chalcogenide compound (such as $TiS_2$, $MoS_2$, $V_2O_5$, $MnO_2$, $CoO_2$ etc.), a combination thereof with Li (such as $LiMnO_2$, $Li_2MnO_4$, $LiCoO_2$, $LiNiO_2$ etc.), a graphite compound prepared from carbonized organic compounds, carbon fluoride, graphite, an electroconductive polymer having an electroconductivity of $10^{-2}$ S/cm (such as polyaniline, polypyrrole, polyazulene, polyphenylene, polyacetylene, polyacene, polyphthalocyanine, poly-3-methylthiophene, polypyridine, polydiphenylbenzidine etc.) and the like. Preferred is the electroconductive polymer, because it has a bonding property and elasticity to some degree and therefore provides strength and flexibility to the obtained composite sheet electrode. The electroconductive polymer may be particulate or fibrous and, in order to enhance the volume energy density, may also be combined with other inorganic active materials as the electrode listed above. When combined with an inorganic active material as an electrode, it is preferred that the electroconductive polymer be present in an amount of 40% by weight or more, because the amount of the heat fusable fiber can be decreased and flexibility of the obtained electrode increases. Carbon powder, carbon fiber, an alkaline metal or an alloy thereof may be used as the cathode electrode.

The electroconductive polymer can be prepared by either electrolytic polymerization or chemical polymerization which is preferred because the polymer can be easily obtained and in a large amount. The chemical polymerization may be conducted by adding an oxidizer in a solution of monomers and then effecting oxidation. Typical examples of the oxidizers are a halogen (e.g. iodine, bromine, bromine iodide), a metal halide (e.g. antimony pentafluoride, silicon fluoride, phosphorus pentachloride), a protonic acid (e.g. sulfuric acid, fluorosulfuric acid, chlorosulfuric acid), an oxygen containing compound (e.g. sulfur trioxide, nitrogen dioxide, potassium perchromate, potassium permanganate), a persulfate (e.g. sodium persulfate, potassium persulfate, ammonium persulfate), a peroxide (e.g. hydrogen peroxide, peracetic acid) and the like.

The active material, as the electrode, may be present in the composite sheet electrode in an amount of 5 to 95% by weight, preferably 60 to 90% by weight, based on the composite sheet electrode. Amounts of less than 5% by weight deteriorate the properties of the cell and those of more than 95% by weight reduce the strength of the composite sheet electrode.

The current collecting material of the present invention include carbon black, glassy carbon powder, graphite powder, carbon fiber, a metal powder (such as stainless steel powder, copper powder), a metal fiber and a mixture thereof. Carbon black and glassy carbon powder are preferred. When the current collecting material is in particulate form, the particle size is within the range of 0.1 to 500 micrometers, preferably 1 to 200 micrometers. Particle sizes of less than 0.1 micrometer easily form agglomerates and those of more than 500 micrometers reduce the dispersibility of the particles into the composite sheet electrode. When the current collecting material is fibrous, the length of the fiber is within the range of 0.01 to 50 mm, preferably 0.1 to 12 mm. Lengths of less than 0.01 easily form agglomerates and those of more than 50 mm reduce its dispersibility in a composite sheet electrode.

The current collecting layer used in the second invention may be prepared from a metal (e.g. stainless steel, gold, platinum, nickel, aluminum, molybdenum, titanium etc.), carbon fiber and the like. Preferred are metal foils, because of their high electroconductivity. The current collecting layer may take any form such as metal foil, metal net, punching metal, an expand metal, a net or unwoven cloth of metal plated fiber, a metal evaporation deposited fiber or metal-containing synthetic fiber. The layer has a thickness of 1 to 1,000 micrometers, preferably 1 to 500 micrometers. Thicknesses of less than 1 micrometer provide poor strength and those of more than 1,000 micrometer reduce flexibility.

The current collecting material may be present in the composite sheet electrode of the first invention in an amount of 1 to 50% by weight, preferably 10 to 30% by weight, based on the total amount of the composite sheet electrode. The current collection material layer may be present in the composite sheet electrode of the second invention in an amount of 1 to 50% by weight, preferably 5 to 20% by weight, based on the total amount of the composite sheet electrode. In both cases, amounts of less than 1% by weight provide poor current collective ability and those of more than 50% by weight reduce the strength of the composite sheet electrode.

The heat fusable short fiber of the present invention can be any one that is fusable when heated, for example a polyester (e.g. polyethylene terephthalate, polybutylene terephthalate), a polyamide (e.g. Nylon 6, Nylon, 6,6, Nylon 12), a polyolefin (e.g. polyethylene, polypropylene), a polyvinyl alcohol, a synthetic pulp, a polyester or polyamide fiber on which a polymer having a low melting point is covered, a mixture thereof, and the like. The length of the fiber may be within the range of 0.1 to 50 mm, preferably 1 to 25 mm. Amounts outside this range reduce the strength of the composite sheet electrode.

The fiber may be present in the composite sheet electrode of the first invention in an amount of 1 to 50% by weight, preferably 3 to 30% by weight, based on the total weight of composite sheet electrode. Amounts of less than 1% by weight provide poor strength and those of more than 50% by weight provide poor electrode properties. In the second invention, the fiber may be present in the composite electrode in an amount of 1 to 95% by weight, preferably 3 to 30% by weight, based on the total weight of the composite sheet electrode. Amounts of less than 1% by weight reduce the strength of the electrode and those of more than 95% by weight provide poor electrode properties.

In the first invention, the composite sheet electrode may contain $CaCO_3$, $MgO$, $Mg(OH)_2$ and a mixture thereof, a spinel ferrite powder (e.g. magnetite), a magnetite branbant type ferrite powder (e.g. barium ferrite, strontium ferrite) and the like. In the second invention, the composite sheet electrode may contain an additive (an electroconductor) to enhance electroconductivity. Examples of the electroconductors are the same as listed as the current collecting material for the first invention. The electroconductor may be contained in an amount of 1 to 50% by weight, based on the total amount of the composite sheet electrode.

The composite sheet electrode of both inventions has a porosity of 20 to 80%, preferably 30 to 70%. If the porosity is less than 20%, the electrolyte does not permeate and if it is more than 80%, the composite sheet electrode has poor strength. The "porosity (%)" herein is measured as follows: First of all, a dry weight (W(g)) and a volume (V(cm$^3$)) of the composite sheet electrode (W(g)) are measured and then the composite sheet electrode is ground to a powder thereby to achieve a real density of the electrode as ρ(cm$^3$). The porosity is calculated from the following formula:

$$\text{Porosity (\%)} = [1-(W/\rho V)] \times 100$$

The composite sheet electrode of the present invention has pores, especially continuous pores, as mentioned above. The continuous pores, for example, are those which extend through the sheet, from one side to the other side, particularly linearly. The presence or absence of such continuous pores is determined by cutting a circular disc having a 10 cm diameter, to which air flows at 1N/min. If its pressure loss is 2,000 mm $H_2O$ or less, the composite sheet electrode has continuous pores. The less the pressure loss, the more the rate of the continuous pores in the composite sheet electrode. Further, the above pressure loss also represents the degree of gas permeability of the composite sheet electrode. In the composite sheet electrode of the present invention, the above pressure loss is preferably not more than 1000 mm $H_2O$, particularly not more than 400 mm $H_2O$.

The composite sheet electrodes of the first and second invention can have a bending strength of not less than 2 kg/cm$^2$, preferably not less than 5 kg/cm$^2$, a conductivity of not less than $10^{-2}$ S/cm and a porosity of 20 to 80%, respectively.

The composite sheet electrode of the present invention is produced by mixing the above active electrode material, current collecting material and heat fusable short fiber, followed by molding. The mixing method may be any method (e.g. dry mixing method, wet mixing method, etc.), however, a wet mixing method is preferred in order to enhance uniformity. A preferred embodiment of a process of making the composite sheet electrode of the first invention will be explained below.

An active material as the electrode, a current collecting material and a heat fusable short fiber are uniformly dispersed in an aqueous medium with sufficient stirring and the mixture is formed into a sheet. The resulting sheet is dehydrated and dried and then subjected to a compression molding under heating to give a composite sheet electrode. Regarding the compression molding under heating, for example, it is preferably conducted under heating at a temperature range between the melting point of the heat fusable short fiber and the melting point of the heat fusable short fiber +50° C., particularly a temperature range between the melting point of the heat fusable short fiber and the melting point of the heat fusable short fiber +30° C. The molding pressure is preferably 10 to 1000 kg/cm$^2$, particularly 50 to 600 kg/cm$^2$. The press time is preferably 0.2 to 900 seconds, particularly 0.5 to 400 seconds. When the molding temperature is less than the above melting point, sufficient strength is hardly obtained and, when it is more than the melting point +50° C. the surface of the electrode-active material is covered with the heat fusable short fiber to result in losing continuous pores and, therefore, sufficient cell properties can hardly be obtained. When the press pressure is less than 10 kg/cm$^2$ or the press time is less than 0.5 seconds, sufficient strength is hardly obtained. When the press pressure exceeds 1000 kg/cm$^2$, it is not economical. Further, when the press time exceeds 900 seconds, the molding cycle becomes too long and, therefore, it is not economical.

The composite sheet electrode of the second invention is produced by laminating a composite sheet obtained by mixing the above active material as the electrode and heat fusable short fiber and forming the mixture into a sheet. The sheet is laminated with the current collecting material layer to obtain the composite sheet electrode. Further, the mixing method may be the same as that used in the production of the above composite sheet electrode of the first invention. A preferred embodiment of a process of producing the composite sheet electrode of the present invention will now be explained.

An active material as the electrode and a heat fusable short fiber are uniformly dispersed in an aqueous medium with sufficient stirring and the mixture is formed into a sheet. The resulting sheet is dehydrated and dried and then subjected to a compression molding under heating to give a composite sheet electrode. Then, by subjecting the composite sheet thus obtained and the current collecting material to compression molding under heating, the composite sheet and the current collecting material are laminated onto each other to obtain a composite sheet electrode of the second invention. The compression molding under heating may be the same as that used in the production of the above composite sheet electrode I.

The composite sheet in the present invention may consist of an active material as the electrode and a heat fusable binding agent and is sufficiently superior in flexibility. In order to combine the composite sheet having a flexibility with the current collecting material without affecting its properties, it is necessary that the bonding layer, which is present between the composite sheet and current collecting material, must also have flexibility.

The bonding layer must be a material which can sufficiently decrease the stress (e.g. swelling, shrinkage of the composite sheet, etc.) attended with bending of the composite sheet electrode, absorption of a solution, occlusion or emission of ions and the like. The bonding layer will be explained in detail below.

The term "bonding layer" used herein means those layers made by using a heat fusable plastic sheet, an adhesive sheet, an adhesive, a pressure sensitive adhesive and the like. As the bonding layer, a conductive material can also be used as long as it has high flexibility, and those having high conductivity are preferred. In the case of using a non-conductive bonding layer, a current collecting material having a through opening is provided between a flexible material (e.g. heat fusable plastic sheet, adhesive sheet, etc.) and a composite sheet to conduct current collection from the composite sheet, and the composite sheet is adhered to the flexible material through the opening. In order to compose the bonding layer, for example, modified polyethylene, modified polypropylene, etc. can be used as the heat fusable plastic. As the pressure sensitive adhesive, for example, those in which an adhesive is applied to a conventional plastic sheet, such as polyester can be used. Further, there can also be used those in which a current collecting material (e.g. metal mesh, expand metal, punching metal, etc.) having a through opening is adhered to the above material in advance. The composite sheet can be adhered to the current collecting material by laminating a sheet-like material, a sheet-like current collecting material and a composite sheet to each other, followed by contact bonding or heat fusing. The conductive bonding layer is made by using a conductive adhesive, a conductive pressure sensitive adhesive and a conductive fusable sheet. The resistivity of the conductive bonding layer is preferably not more than $1\times10^1$ Ωcm, more preferably not more than $1\times10^{-1}$ Ωcm. In this case, a sheet-like current collecting material is generally adhered or heat fused to a composite sheet with the above material to form a composite sheet electrode, and the sheet-like material and the bonding layer may be the same material. In this case, the current collecting material and the bonding layer can be used alone or used in an integral construction. As the bonding layer, for example, there can be used a rubber conductive adhesive, bonding layers in which a conductive particle is dispersed in a pressure sensitive adhesive or those in a tape form or a conductive film in which a heat fusable plastic film is allowed to composite with conductive particles and the like. Among them, it is preferred to use a conductive adhesive from the viewpoint of current collecting ability. The conductive adhesive will be explained below.

As the conductive adhesive, for example, those in which a conductive filler is formulated in a resin material are generally used. The conductive filler may be any conductive substance, and carbon material is preferred. As the conductive filler, for example, there is a metallic material (e.g. Ni. Cu, stainless steel, etc.), however, there are a lot of problems (e.g. corrosion, electrochemical stability, etc.) with the use of metals. Even if there is no problem, the metal itself is extremely expensive. Further, the metal is heavy and there is a disadvantage that the energy density of the cell becomes inferior. This is not limited to the conductive adhesive but is applied to all materials using the conductive substance. On the other hand, a carbon material is stable to an organic solvent and, at the same time, it is electrochemically stable. Therefore, it is a suitable material as a conductive material which can be used for an electrochemical element which hardly causes an electrochemical reaction. Typical examples thereof include materials such as graphite powder, carbon powder, carbon fiber and the like.

It is preferred to use a rubber material as the resin material in the conductive adhesive in order to impart flexibility to the bonding layer. The rubber material is a material having a rubber elasticity, and both natural rubber and synthetic rubber can be used. Preferred rubber materials are rubbers having a rubber elasticity in a wide temperature range, which are electrochemically stable and are not dissolved in an organic solvent. Examples thereof include polybutadiene, polyisoprene rubber, polychloroprene rubber, styrene-butadiene rubber (SBR), butyl rubber, silicone rubber and the like.

When a resin having no rubber elasticity at a normal temperature (e.g. phenol resin, epoxy resin, polyamide resin, polyester resin, etc.) is used as the conductive resin material, there is a disadvantage that the flexibility of the composite sheet electrode is remarkably deteriorated and the bonding layer has no flexibility to deformation (e.g. bending, etc.), which results in peeling of the bonding surface. Further, when an electrochemical reaction is conducted, the resin component of the bonding surface is not deformed corresponding to deformation due to swelling or shrinkage attended with charging or discharging of the composite sheet; therefore, the composite sheet and current collecting material are peeled off, which results in deterioration of electrode properties. This is not limited to the conductive adhesive but is applied to all materials used for the conductive bonding layer, and it is necessary that the conductive layer have flexibility.

In order to form a composite of the current collecting material, using a conductive adhesive with the composite sheet, there can be used a method comprising applying a liquid as an adhesive, wherein the above conductive material and the resin material are dispersed or dissolved in an aqueous medium, to the surface to be adhered and laminating the two members to each other and, then solidifying with heating. As the medium, for example, an organic solvent is preferred from the viewpoint of simple drying. However, a low boiling point solvent which is dried during the application process of the adhesion or a high boiling point solvent which is hardly evaporated is not preferred. A solvent having a boiling point of 70° to 130° C., wherein the difference between the vapor pressure at room temperature and the vapor pressure upon heating is large, is preferred because the deterioration of the adhesion strength can be diminished and the time for adhering can also be decreased. The adhesion area of the current collecting material with the composite sheet can be optionally selected, however, and it is preferred that the current collecting material be adhered to one side of the composite sheet all over from the viewpoint of the current collecting ability and adhesion strength. It is preferred that the thickness of the adhesion layer be uniform and thin from the viewpoint of the energy density. However, when the amount of swelling and shrinkage or deformation of the composite sheet is increased (adhesion of a sheet having large area and large thickness), it is necessary to increase the thickness of the bonding layer having flexibility from the viewpoint of preventing the peeling of the composite sheet. This is also applied to the other materials. It is preferred that the ratio of the thickness of the bonding layer to that of the composite sheet be 2 to 20%, more preferably 5 to 15% from the viewpoint of the adhesion strength and energy density. When the ratio is less than 2%, the strength becomes inferior and, when the ratio is more than 20%, the energy density is lowered and it is not economical. The term "thickness of bonding layer" used herein does not mean the thickness of the bonding layer alone, but the thickness, including the thickness of the part integrated with the composite sheet. This means that the adhesive penetrates into the opening of the composite sheet as soon as the composite sheet is adhered to the current collecting material. The bonding layer integrated with the composite sheet is included in an amount of not less than 50%, more preferably not less than 80% for entire bonding layer.

The composite sheet electrode of the present invention can be used by laminating a composite sheet on both sides of the current collecting material. In this case, it is preferred that the composite area of the current collective material and the conductive bonding layer be smaller than that of the composite sheet and the conductive bonding layer. For example, the ratio of the area of the former to that of the latter is 70 to 100%, preferably 80 to 100%, more preferably 90 to 98%. It is necessary that the current collecting material be uniformly used between composite sheets without extrusion. When the ratio is less than 70%, the current collective ability is not sufficient and, when it is more than 100%, the current collecting material becomes useless, whereby, the energy density of the electrode is lowered. When the ratio is in the range of 90 to 98%, two composite sheets can be directly composited at the end of the electrode through a conductive bonding layer without using the current collecting material to integrate both composite sheets. Accordingly, the adhesion strength of the end of the electrode at which peeling is liable to be caused by a stress attended with deformation (e.g. bending, etc.) of the composite sheet electrode, or swelling or shrinkage of the composite sheet can be enhanced and, therefore, peeling of the composite sheet and the current collecting material can be prevented. When the ratio is 100%, it is preferred to apply an adhesive to the end surface of the composite sheet electrode from the viewpoint of preventing peeling of the end surface. Further, it is most preferred to use the current collecting material having a through opening from the point of view of integrating both composite sheets.

The conductive adhesive used in the present invention is that in which a conductive filler is formulated in an adhesive resin material. The conductivity of the adhesive is preferably not more than $1 \times 10^0$ $\Omega$cm, more preferably not more than $5 \times 10^{-1}$ $\Omega$cm. As the conductive filler, for example, a carbon material is preferred. As the conductive filler, for example, there can be used a metallic material, however, there are a lot of problems (e.g. corrosion, electrochemical stability, etc.) which occur by use of a metal. Even if there is no problem, the metal itself is expensive. Further, the metal is heavy and there is a disadvantage that the energy density of the cell becomes inferior.

By using the composite sheet electrodes I and II of the present invention thus obtained, a cell can be produced. The cell of the present invention is substantially composed of a positive electrode, a negative electrode and an electrolytic solution and, further, a separator may be provided between electrodes. The electrolytic solution is mainly composed of an electrolyte and a solvent, and a solid electrolyte can be used instead of the electrolytic solution.

As the positive electrode of the cell of the present invention, for example, the above composite sheet electrodes I and II of the present invention can be used. As the negative electrode, for example, there can be used metal (e.g. Li, Na, K, Ag, etc.), lithium alloy (e.g. Li—Al, Li—Mg, Li—Si, Li—Zn, etc.), powdered or fibrous carbon, or conductive polymer (e.g. polyacetylene, polyaniline, polypyrrole, polyparaphenylene, polythiophene, polypyridine, etc.) as the active material for the electrode.

As the dopant of the electrolytic solution of the cell, for example, there can be used the negative ions or positive ions as described below. As the negative ion, for example, there can be used halogenated anions of the Va group elements (e.g. $PF_6^-$, $SbF_6^-$, $AsF_6^-$, $SbCl_6^-$, etc.), halogenated anions of the IIIa group elements [e.g. $BF_4^-$, $(BR^1_4)^{31}$ (wherein $R^1$ is a phenyl or alkyl group), etc.], perchloric anion (e.g. $ClO_4^-$, etc.), halogen anions (e.g. $Cl^-$, $Br^-$, $I^-$, etc.), trifluoromethanesulfonic acid and the like, and at least one type can be used. As the positive ion, for example, there are alkali ions (e.g. $Li^+$, $Na^+$, $K^+$, etc.), $(R^2_4N)^+$ (wherein $R^2$ is a hydrocarbon group having 1 to 20 carbon atoms) and the like, and at least one of them can he used.

Examples of the compound which provides the above electrolyte include $LiPF_6$, $LiSbF_6$, $LiAsF_5$, $LiClO_4$, $KPF_5$, $NaClO_4$, $KI$, $KSbF_5$, $KAsF_5$, $KClO_4$, $[(n-Bu)_4N]^+ \cdot AsF_5^-$, $[(n-Bu)_4N]^+ \cdot BF_4$, $LiAlC_4$, $LiBF_4$, $LiCF_3SO_3$ and the like, and at least one of them can be used.

The solvent which constitutes the electrolytic solution is not specifically limited and a solvent having comparatively large polarity is preferably used. Examples thereof include propylene carbonate, ethylene carbonate, henzonitrile, acetonitrile, tetrahydrofuran, 2-methyltetrahydrofuran, γ-butyllactone, dioxolane, triethyl phosphite, dimethylformamide, dimethylacetoamide, dimethylsulfoxide, dioxane, dimethoxyethane, polyethylene glycol, sulforane, dichloroethane, chlorobenzene, nitrobenzene and the like, and a mixed solution thereof.

As the separator, for example, there can be used any one which shows low resistance to ionic migration of the electrolyte solution and is superior in a solution stability. Examples thereof include glass fiber filters, polymeric pore-filters (e.g. polyester, Teflon®, polyflon, polypropylene, etc.), non-woven fabrics of glass fibers and/or polymers.

Further, as the constituent element which takes the place of the electrolyte solution and separator, for example, a solid electrolyte can he used. As the inorganic solid electrolyte, for example, there can he used a metal halide (e.g. AgCl, AgBr, AgI, LiI, etc.), $RbAg_4I_5$, $RbAg_4I_4CN$ and the like. As the organic solid electrolyte, for example, there can he used a composite in which the above-described electrolyte is dissolved in a polymer matrix (e.g. polyethylene oxide, polypropylene oxide, polyvinylidene fluoride, polyacrylamide, etc.) or a gel crosslinked material thereof, a polymeric solid electrolyte (e.g. low molecular weight polyethylene oxide, crown ether, etc.) in which an ionic dissociation group is grafted to a polymer main chain and the like.

The form of the cell is not specifically limited and various types (e.g. coin type, sheet type, cylinder type, rectangular type, etc.) of cells can be produced.

As described above, the cell of the present invention thus obtained can have high energy density and high output characteristics as cell properties.

The following Reference Examples, Examples and Comparative Examples further illustrate the present invention in detail but are not to be construed to limit the scope thereof.
Preparation of active electrode material Reference Example 1

Aniline (20 g) was charged in a 1 liter three neck distillation flask and dissolved in 5.5N $H_2SO_4$ (500 g). A solution obtained by dissolving ammonium persulfate (20 g) in water (200 g) at 5° C. was added dropwise to the mixture over 30 minutes, followed by stirring at 5° C. for 2 hours. A limegreen precipitate thus obtained was filtered, washed with methanol and filtered off. Then, the precipitate was dried under vacuum at 30° C. for 12 hours to obtain 8 g of a polyaniline powder.

Reference Example 2

Pyrrole (50 g) was added dropwise to a 3.5 Mol ferric chloride solution (500 g) maintained at 0° C. with stirring to conduct a reaction. The resulting black powder was washed with methanol, filtered off and dried under vacuum to obtain 30 g of a polyvinyl powder.
Preparation of composite sheet electrode

EXAMPLE 1

The active electrode material (5 g) of Reference Example 1, a glassy carbon GCP-10H (manufactured by Unitika Co.; 1 g) and a polyester fiber Merty 4080 (manufactured by Unitika Co.; 0.5 g) were introduced in water (10 liters), followed by stirring for 5 minutes. Then, the mixture was formed into a sheet, using a sheeting machine (manufactured by Kumagaya Riki Kogyo K.K.). The resulting sheet was dried under vacuum at 30° C. for 12 hours. Then, this sheet was placed in a mold and pressed at 100 kg/cm² at 120° C. for 60 seconds to obtain a composite sheet electrode having a thickness of 0.8 mm, a bending strength of 6 kg/cm², a porosity of 75% and a pressure loss of 260 mm $H_2O$ (composite sheet electrode 1).

EXAMPLE 2

According to the same manner as that described in Example 1 except for using 7 g of the active electrode material instead of 5 g of the active material, a composite sheet electrode having a thickness of 0.8 mm, a bending strength of 5.5 kg/cm², a porosity of 69% and a pressure loss of 310 mm $H_2O$ (composite sheet electrode 2) was obtained.

EXAMPLE 3

According to the same manner as that described in Example 1 except for using the active electrode material of Reference Example 2 (5 g) instead of the active material of Reference Example 1, a composite sheet electrode having a thickness of 0.8 mm, a bending strength of 5 kg/cm², a porosity of 72% and a pressure loss of 290 mm $H_2O$ (composite sheet electrode 3) was obtained.
Production of cell using a composite sheet electrode I

EXAMPLES 4 TO 6

By using each composite sheet electrode of Examples 1, 2 and 3 as a positive electrode, using a lithium aluminum alloy (described in Japanese Patent Kokai No. 61-8849) as a negative electrode and using a 3 Mol $LiBF_4 PC/DME$ (=7/3) solution as an electrolyte, each CR-2016 type lithium secondary cell (Examples 4 to 6) was produced, respectively. The properties of each secondary cell were evaluated under the conditions of charging and discharging at a constant current (1 mA). The results are shown below.

|  | Example 4 | Example 5 | Example 6 |
|---|---|---|---|
| Voc (V) | 3.3 | 3.3 | 2.9 |
| Ah capacity (mAh) |  |  |  |
| 50 cycle | 4.4 | 5.3 | 3.5 |
| 100 cycle | 4.1 | 5.0 | 3.4 |

Preparation of active electrode material

Reference Example 3

According to a method described in *Progress in Batteries & Solar Cells*, M. Yoshio, H. Nakamura, Gen-Pei Pian and A. Kozawa, Vol. 8, page 175 (1989), electrolytic manganese dioxide was allowed to composite with lithium.

Preparation of Composite sheet electrode II

EXAMPLE 7

The active electrode material (5 g) obtained in Reference Example 3 and a polyester fiber Melty 4080 (manufactured by Unitika Co.; 0.5 g) were introduced in water (10 liters), followed by stirring for 5 minutes. Then, the mixture was formed into a sheet, using a sheeting machine (manufactured by Kumagaya Riki Kogyo K.K.). The resulting sheet was dried under vacuum at 30° C. for 12 hours. Then, this sheet was placed in a rectangular wire cloth made of molybdenum-containing stainless steel SUS 316 (thickness: 90 μm) and pressed at 100 kg/cm$^2$ at 120° C. for 60 seconds to obtain a composite sheet electrode having a thickness of 0.8 mm, a bending strength of 8 kg/cm$^2$, a porosity of 75% and a pressure loss of 260 mm H$_2$O.

EXAMPLE 8

According to the same manner as that described in Example 7 except for using 7 g of the active electrode material obtained in Reference Example 1, a composite sheet electrode having a thickness of 0.8 mm, a bending strength of 7 kg/mm$^2$, a porosity of 69% and a pressure loss of 310 mm Hg was obtained.

EXAMPLE 9

According to the same manner as that described in Example 7, except for using 5 g of the active electrode material obtained in Reference Example 2, a composite sheet electrode having a thickness of 0.8 mm, a bending strength of 6 kg/mm$^2$, a porosity of 72% and a pressure loss of 290 mm Hg was obtained.

EXAMPLE 10

Accordingly to the same manner as that described in Example 7, except for using the active material obtained in Reference Example 3, a composite sheet electrode having a thickness of 0.8 mm, a bending strength of 6.4 kg/mm$^2$, a porosity of 71% and a pressure loss of 280 mm Hg was obtained.

EXAMPLE 11

The active material (5 g) obtained in Reference Example 3 and an interlooped polypropylene fiber having metal fusing property (0.5 g) were introduced in water (10 liters), followed by stirring for 5 minutes. Then, the mixture was formed into a sheet, using a sheeting machine. The resulting sheet was dried under vacuum at 30° C. for 12 hours. Then, this sheet and a punching metal of SUS 304 having a thickness of 0.02 mm wherein an opening having a diameter of 0.9 mm was provided in an opening ratio of 23% were placed in a mold and pressed at 100 kg/cm$^2$ at 120° C. for 60 seconds to obtain a composite sheet electrode of 0.20 mm (thickness)×40 mm×40 mm. This composite sheet electrode was flexible and 90° bending could be conducted.

Production of cell using composite sheet electrode II

EXAMPLES 12 TO 15

By using each composite sheet electrode of Examples 7 to 10 as a positive electrode, using a lithium-aluminum alloy (prepared according to a method described in Japanese Patent Kokai No. 61-8849) as a negative electrode and using 3 Mol LiBF$_4$PC/DMF (=7/3) solution as an electrolytic solution, each CR-2016 type lithium secondary cell (Examples 12 to 15) was produced, respectively.

EXAMPLE 16

By using a composite sheet electrode of Example 11 as a positive electrode and using an electrode wherein a plate of SUS 304 having a thickness of 0.02 mm and a plate of lithium having a thickness of 0.08 mm are laminated to each other as a negative electrode, a polypropylene filter (trade name: Cellguard) having a thickness of 0.025 mm was sandwiched between the positive electrode and the negative electrode. By using a 3 Mol LiBF$_4$ propylene carbonate/dimethoxyethane (=7/3) solution as an electrolytic solution, a thin secondary cell having a thickness of 1.3 mm was made.

Properties of the secondary cell (Examples 12 to 16) were evaluated by charging and discharging at a constant current (1 mA). The results are shown below.

|  | Ex. 12 | Ex. 13 | Ex. 14 | Ex. 15 | Ex. 16 |
| --- | --- | --- | --- | --- | --- |
| Voc (V) | 3.90 | 3.30 | 2.90 | 3.1 | 11.0 |
| Ah capacity (mAh) | | | | | |
| 50 cycle | 4.0 | 4.9 | 3.2 | 10.2 | 8.5 |
| 100 cycle | 3.9 | 4.7 | 3.1 | 9.5 | 8.1 |

Reference Example 4

Aniline (20 g) was charged in a 1 liter three neck distillation flask and dissolved in 5.5N H$_2$SO$_4$ (500 g). A solution obtained by dissolving ammonium persulfate (20 g) in water (200 g) at 5° C. was added dropwise to the mixture over 30 minutes, followed by stirring at 5° C. for 2 hours. A limegreen precipitate thus obtained was filtered, washed in turn with water and methanol and filtered off. Then, the precipitate was subjected to a reduction treatment in a 20 volume % hydrazine monohydrate-methanol solution and dried under vacuum at 80° C. for 12 hours to obtain 4 g of a polyaniline powder.

EXAMPLE 17

The active material (5 g) obtained in Reference Example 4, a glassy carbon GCP-10H (manufactured by Unitika Co.; 1 g) and a polyester fiber Melty 4080 (manufactured by Unitika Co.; 0.5 g) were introduced in water (10 liters), followed by stirring for 5 minutes. Then, the mixture was formed into a sheet, using a sheeting machine (manufactured by Kumagaya Riki Kogyo K.K.). The resulting sheet was dried under vacuum at 30° C. for 12 hours. Then, this sheet was placed in a mold and pressed at 100 kg/cm$^2$ at 120° C. for 60 seconds to obtain a composite sheet having a thickness of 12 mm, a bending strength of 6 kg/cm$^2$, a porosity of 75% and a pressure loss of 260 mm H$_2$O.

By using a conductive adhesive containing a natural rubber Dotite RA-3 (manufactured by Fujikura Kasei K.K.) as a resin and using a carbon as a conductive fiber, two composite sheets thus obtained were adhered to both surfaces of an expanded metal made of SUS 304, as shown in FIG. 1. Adhesion was conducted at 80° C. under reduced pressure for 30 minutes (the ratio of adhesion area of the current collecting material to the composite sheet was 94%). A fracture surface of the electrode was observed by scanning electric microscopy. As a result, the thickness of the bonding layer was found to be 70 μm.

By using this composite sheet electrode as a positive electrode, using a lithium aluminum alloy (prepared according to Japanese Kokai Publication 61-8849) as a negative electrode and using a 3M LiBF$_4$PC/DME (=7/3) solution as an electrolytic solution, a beaker type cell was produced. Then, the properties of the cell were evaluated (2.5 to 3.7 V, charging and discharging at ±5 mA). As a result, it was found that the initial capacity was 106 mAh and the capacity at 50 cycle was 96 mAh. No peeling or falling off of the composite sheet was observed.

EXAMPLE 18

According to the same manner as that described in Example 17 except that adhesion was conducted at 95° C. under reduced pressure for 60 minutes, using carbon as a conductive filler and using a conductive adhesive Dotite RA65 (manufactured by Fujikura Kasei K.K.) containing a silicone rubber as a resin, a composite sheet electrode was made. The thickness of the bonding layer was 65 μm. Then, the properties of the cell were evaluated. As a result, it was found that the initial capacity was 99 mAh and the capacity at 50 cycle was 90 mAh. No peeling off of the composite sheet was observed.

Comparative Example 1

According to the same manner as that described in Example 17 except for using carbon as a conductive filler, using a conductive adhesive FC-404CA (manufactured by Fujikura Kasei K.K.) containing a polyester as a resin, adhesion was conducted at 30° C. under reduced pressure for 30 minutes, and a composite sheet electrode was made. Adhesion of the resulting composite sheet electrode was excellent. Then, properties of the cell were evaluated using this electrode. As a result, the composite sheet was peeled off from the current collecting material at the first charging, which resulted in insufficient performance as a cell.

EXAMPLE 19

According to the same manner as that described in Example 17 except for using the active material (7 g) obtained in Reference Example 4, a composite sheet having a thickness of 1.2 mm, a bending strength of 5.5 kg/cm$^2$, a porosity of 69% and a pressure loss of 310 mm Hg was obtained.

According to the same manner as that described in Example 17 except for using this composite sheet, a composite sheet electrode was made. The thickness of the bonding layer was 100 μm. Then, the properties of the cell were evaluated. As a result, it was found that the initial capacity was 129 mAh and the capacity at 50 cycle was 119 mAh. No peeling or falling off of the composite sheet was observed.

EXAMPLES 20 AND 21

By using a composite sheet obtained in Examples 17 and 19 as a positive electrode, using a lithium-aluminum alloy (prepared by a method described in Japanese Patent Kokai No. 61-8849) as a negative electrode and using the same electrolytic solution as that of Example 17, a coin type lithium secondary cell (CR 2016 type) was produced. In this case, the composite sheet was directly adhered to the bottom surface of a positive electrode casting segment, using a conductive adhesive Dotite RA3 (manufactured by Fujikura Kasei K.K.). Properties of the cell were evaluated by charging and discharging at a constant current (1 mA).

|  | Example 20 | Example 21 |
| --- | --- | --- |
| Voc (V) | 3.3 | 3.3 |
| Ah capacity (mAh) | | |
| 50 cycle | 3.7 | 4.5 |
| 100 cycle | 3.6 | 4.3 |

EXAMPLE 22

According to the same manner as that described in Example 17 except for using a polypyrrole powder (5 g) of Reference Example 5, a composite sheet was made. The composite sheet had a thickness of 0.8 mm, a bending strength of 5 kg/cm$^2$, a porosity of 72% and a pressure loss of 290 mm Hg. By using this sheet, a coin type cell was made according to the same manner as that described in Examples 20 and 21. It was found that the Voc was 2.9 V, the Ah capacity after 50 cycles was 3.0 mAh and the Ah capacity after 100 cycles was 2.9 mAh.

EXAMPLE 23

According to the same manner as that described in Example 17 except for using the active material obtained in Reference Example 6, a composite sheet having a thickness of 0.4 mm, a bending strength of 9 kg/cm$^2$, a porosity of 60% and a pressure loss of 420 mm Hg was obtained. According to the same manner as that described in Examples 20 and 21 except for using this composite sheet, a coin type cell was made. It was found that the Voc was 3.1 V, the Ah capacity after 50 cycles was 9.4 mA hand the Ah capacity after 100 cycles was 8.8 mAh.

EXAMPLE 24

According to the same composition as that described in Example 17, a composite sheet having a thickness of 0.3 mm (size: 0.3 mm×125 mm×150 mm) was made. This sheet was cut into a sheet of 110 mm×135 mm, which was adhered to the center of a plate of SUS 304 whose surface had been subjected to a blast treatment (emery paper: #202, pressure: 1 kg/cm$^2$), using the same conductive adhesive as that of Example 17. This composite sheet electrode was immersed in an electrolytic solution having a composition of 79% 3M LIBF$_4$ PC/DME (=7/3), 20% ethoxydiethylene glycol acrylate and 1% benzoyl peroxide under reduced pressure. Then, a polypropylene porefilter containing the above electrolytic solution was placed on the composite sheet electrode, followed by irradiation with a high pressure mercury vapor lamp to solidify the electrolytic solution (member 1).

Furthermore, the other plate of SUS 304 (125 mm×150 mm) subjected to a blast treatment was subjected to contact bonding to composite with a lithium foil (composited area: 111 mm×136 mm). The above electrolytic solution was applied to the resulting composite and irradiated with a light of a high pressure mercury vapor lamp to solidify the electrolytic solution (member 2).

Figure 2:
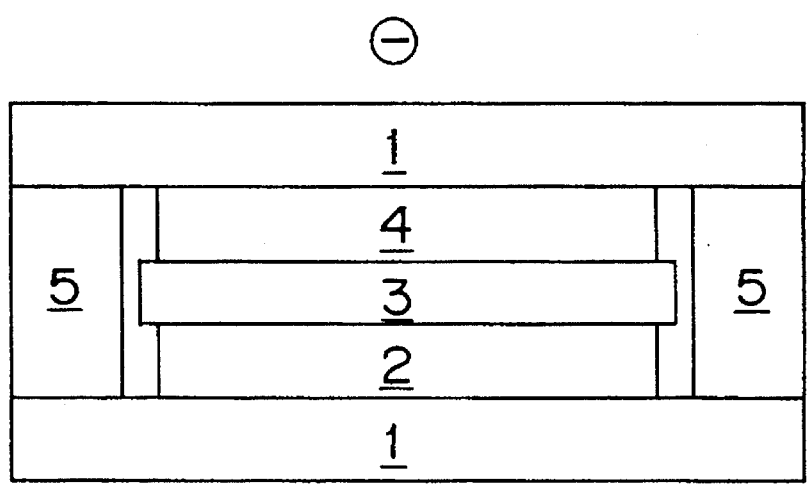
FIG. 2 is a cell using the composite sheet electrode.

The member 1 and member 2 were laminated to each other through a polyethylene frame having a heat fusing layer of modified polyethylene at the front and back surface, and four sides thereof were heat-sealed to make a thin cell having a large area as shown in FIG. 2 (6.5 mm×125 mm×150 mm).

The properties of the cell were evaluated. As a result, it was found that the initial capacity was 180 mAh and the capacity after 10 cycles was 178 mAh.

What is claimed is:

1. A composite sheet electrode having a porosity of 20 to 80%, which comprises:

(a) a composite sheet comprising a mixture of 5 to 95% by weight of an active electrode material and 5 to 95% by weight of heat fusible fibers, wherein said active electrode material is selected from the group consisting of a transition metal oxide, a transitional metal chalcogenide compound other than transition metal oxide, a combination thereof with Li, a graphite compound prepared from carbonized organic compounds, carbon fluoride, graphite and an electroconductive polymer having an electronductivity of $10^{-2}$ S/cm, and wherein said heat fusible fibers have a length of 0.1 to 50 mm and are selected from the group consisting of a polyester, a polyamide, a polyolefin, a polyvinyl alcohol, a synthetic pulp, a polyester fiber covered with a low melting point polymer, a polyamide covered with a low melting point polymer, and mixtures of said fibers, and (b) a current collecting material layer laminated on said composite sheet, wherein said current collecting material is selected from the group consisting of carbon black, glassy carbon powder, graphite powder, carbon fiber, metal powder, metal fiber, and mixtures thereof.

2. The composite sheet electrode according to claim 1 wherein said composite sheet and said current collecting material layer are bonded with a bonding layer.

3. The composite sheet electrode according to claim 1 wherein said composite sheet and said current collecting material layer are bonded with a bonding layer.

4. In a cell comprising a positive electrode, a negative electrode and a electrolyte solution, the improvement wherein the composite sheet electrode according to claim 1 is used as an electrode.

5. In a cell comprising a positive electrode, a negative electrode and an electrolytic solution, the improvement wherein the composite sheet electrode according to claim 2 is used as an electrode.

6. The composite sheet electrode according to claim 1 in which the fiber lengths are within the range of 1 to 25 mm.

7. A cell according to claim 4 in which the composite sheet electrode is the positive electrode.

8. A cell according to claim 5 in which the composite sheet electrode is the positive electrode.

* * * * *